(12) United States Patent
Schade

(10) Patent No.: US 7,958,961 B1
(45) Date of Patent: Jun. 14, 2011

(54) SEGWAY WITH GOLF IMPROVEMENTS

(76) Inventor: Christopher W. Schade, Fishers, IN (US)

( * ) Notice: Subject to any disclaimer, the term of this patent is extended or adjusted under 35 U.S.C. 154(b) by 104 days.

(21) Appl. No.: 12/548,313

(22) Filed: Aug. 26, 2009

Related U.S. Application Data

(60) Provisional application No. 61/091,967, filed on Aug. 26, 2008.

(51) Int. Cl.
B60K 28/04 (2006.01)

(52) U.S. Cl. ........ 180/273; 180/19.1; 180/218; 280/727

(58) Field of Classification Search ................ 180/19.1, 180/19.2, 19.3, 218, 273; 280/727
See application file for complete search history.

(56) References Cited

U.S. PATENT DOCUMENTS

| | | | |
|---|---|---|---|
| 3,812,929 | A | 5/1974 | Farque |
| 4,106,583 | A | 8/1978 | Nemeth |
| 4,848,504 | A | 7/1989 | Olson |
| 4,874,055 | A | 10/1989 | Beer |
| 5,346,028 | A | 9/1994 | Cassano |
| D389,782 | S | 1/1998 | Scott et al. |
| 5,711,388 | A | 1/1998 | Davies et al. |
| 5,944,132 | A | 8/1999 | Davies et al. |
| 5,971,091 | A | 10/1999 | Kamen et al. |
| 5,975,225 | A | 11/1999 | Kamen et al. |
| 6,288,505 | B1 | 9/2001 | Heinzmann et al. |
| 6,415,879 | B2 | 7/2002 | Kamen et al. |
| 6,659,208 | B2 * | 12/2003 | Gaffney et al. ............... 180/19.2 |
| 6,779,621 | B2 | 8/2004 | Kamen et al. |
| 7,086,491 | B2 | 8/2006 | Matte |
| 2001/0022242 | A1 | 9/2001 | Kamen et al. |
| 2001/0032743 | A1 | 10/2001 | Kamen et al. |
| 2002/0063006 | A1 | 5/2002 | Kamen et al. |
| 2006/0191726 | A1 | 8/2006 | Matte |
| 2007/0131461 | A1 * | 6/2007 | Treadwell et al. ........... 180/19.1 |
| 2007/0205241 | A1 | 9/2007 | Mourao |
| 2009/0242285 | A1 * | 10/2009 | Whetstone, Jr. ............. 180/19.2 |

* cited by examiner

Primary Examiner — Paul N. Dickson
Assistant Examiner — Barry Gooden, Jr.
(74) Attorney, Agent, or Firm — Chad Bruggeman; Middleton Reutlinger

(57) ABSTRACT

A SEGWAY adapted with a mechanism to manually override the rider detection mechanical sensors to allow a golfer to choose to ride or not ride the SEGWAY while playing golf. A handle attachment extends outwardly enabling the golfer to manually steer and thus control the speed and direction of the SEGWAY while not riding the SEGWAY. The golfer can ride, walk, or run as desired in unison with the improved SEGWAY. A rider detection override mechanism is positioned under each existing step pad. A counterweight is placed at the rear of the SEGWAY to balance the SEGWAY when there is no rider present.

10 Claims, 6 Drawing Sheets

SEGWAY WITH GOLF IMPROVEMENTS

CROSS-REFERENCE TO PRIOR APPLICATION

This application, under 35 USC §119(e), claims priority to U.S. Provisional Patent Application No. 61/091,967, filed on Aug. 26, 2008, which is incorporated herein by reference.

TECHNICAL FIELD

The present invention relates to a SEGWAY and particularly to a SEGWAY with golf improvements.

DETAILED DESCRIPTION

Figure 1:
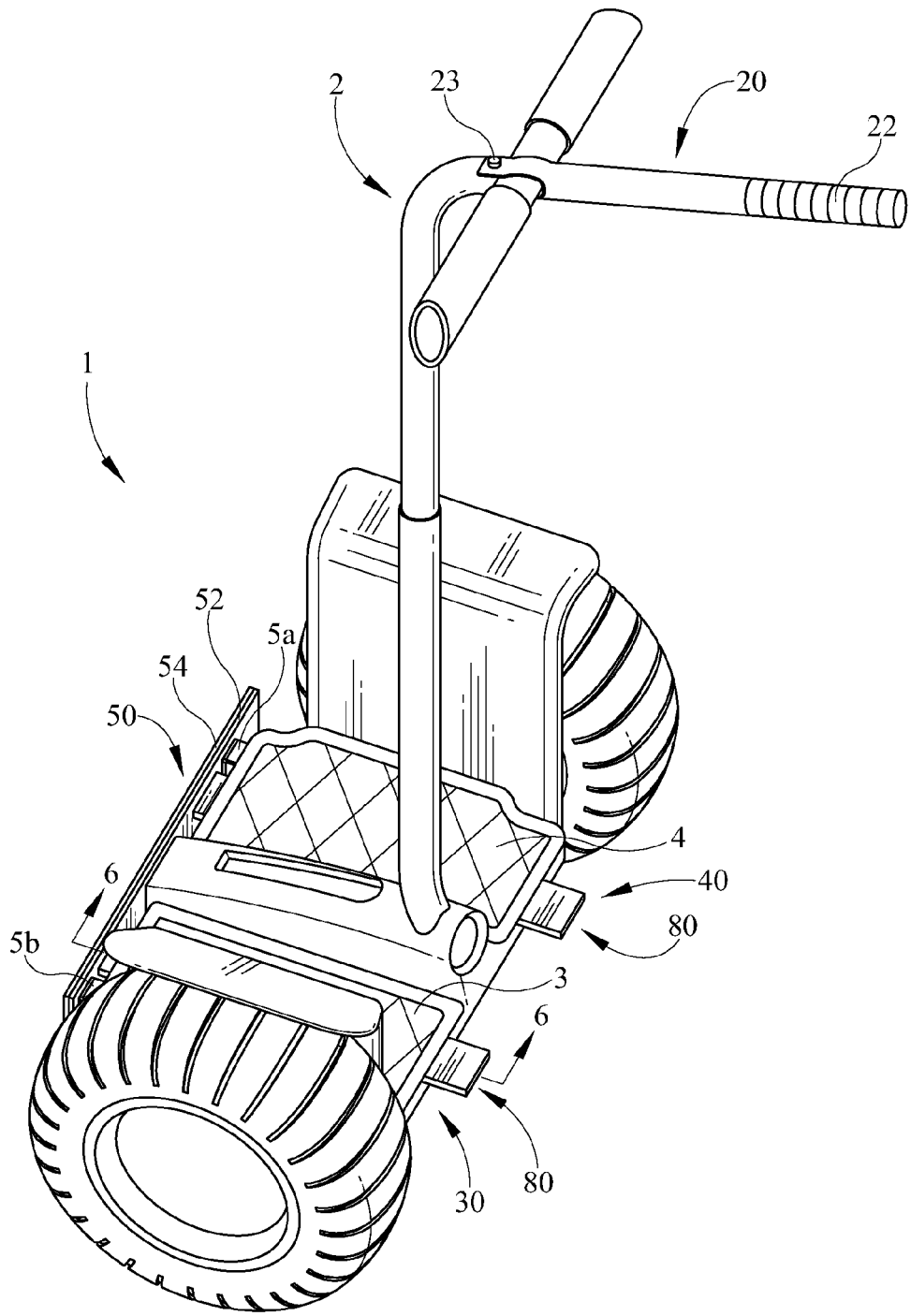
FIG. 1 shows a top perspective view of an embodiment of the SEGWAY with golf improvements, illustrating the kick plates in the engaged position.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The SEGWAY has been available in recent years to enable golfers to ride with their golf bag positioned over a single wheel, as in the SEGWAY x2 Golf. However, the rider/golfer must dismount the SEGWAY, turn off the device, and lay the device back onto the golf bag stand before selecting his/her club due to rider detection sensors. This results in the golf bag being substantially vertical. After completing the swing the golfer must reverse these laborious steps to get back on the SEGWAY to proceed to the next golf ball location.

The presently designed invention as shown in FIGS. 1-6 enables the golfer to manually override the rider detection sensors in order to direct and control the speed of the improved SEGWAY 1 while not requiring the user to be presently riding the SEGWAY, as well as having the option of riding all or portions of the golf course. The improved SEGWAY 1 does not have to be turned off nor laid over to go swing the golf club. The improved SEGWAY 1 remains in the upright and riding position. The golfer has the option of riding the improved SEGWAY 1 or directing the improved SEGWAY when the user is on foot (not riding), at any pace such as walking, jogging, or running. The golfer now has the option to exercise by choosing not to ride the SEGWAY, even though the golf bag (not shown) is still being carted by the SEGWAY.

The presently designed SEGWAY improvement is used to provide the golfer with the ability to choose whether to ride or not ride the improved SEGWAY 1 while playing golf. The SEGWAY 1 improvement comprises an elongated handle attachment or "Balance Control Handle Extension Attachment" or acronym "BHx" 20 projecting forward from the existing handle bars 2 of the SEGWAY. The handle attachment 20 is a 2" diameter pipe 28 ½" in length with a 4" U-cut into the one end of the pipe. The U-cut end of the handle attachment 20 adjacent handle bars 2 may be secured by a fastener 23. The golfer, positioned in front of the SEGWAY, directs the elongated handle attachment 20 in the direction of travel and controls the speed of the SEGWAY by simply applying or removing downward pressure of the handle attachment. The user is able to set his/her own pace while not riding, with the SEGWAY traveling in unison. The handle attachment 20 may be a variety of shapes and may have a grip 22 for hand comfort.

Figure 2:
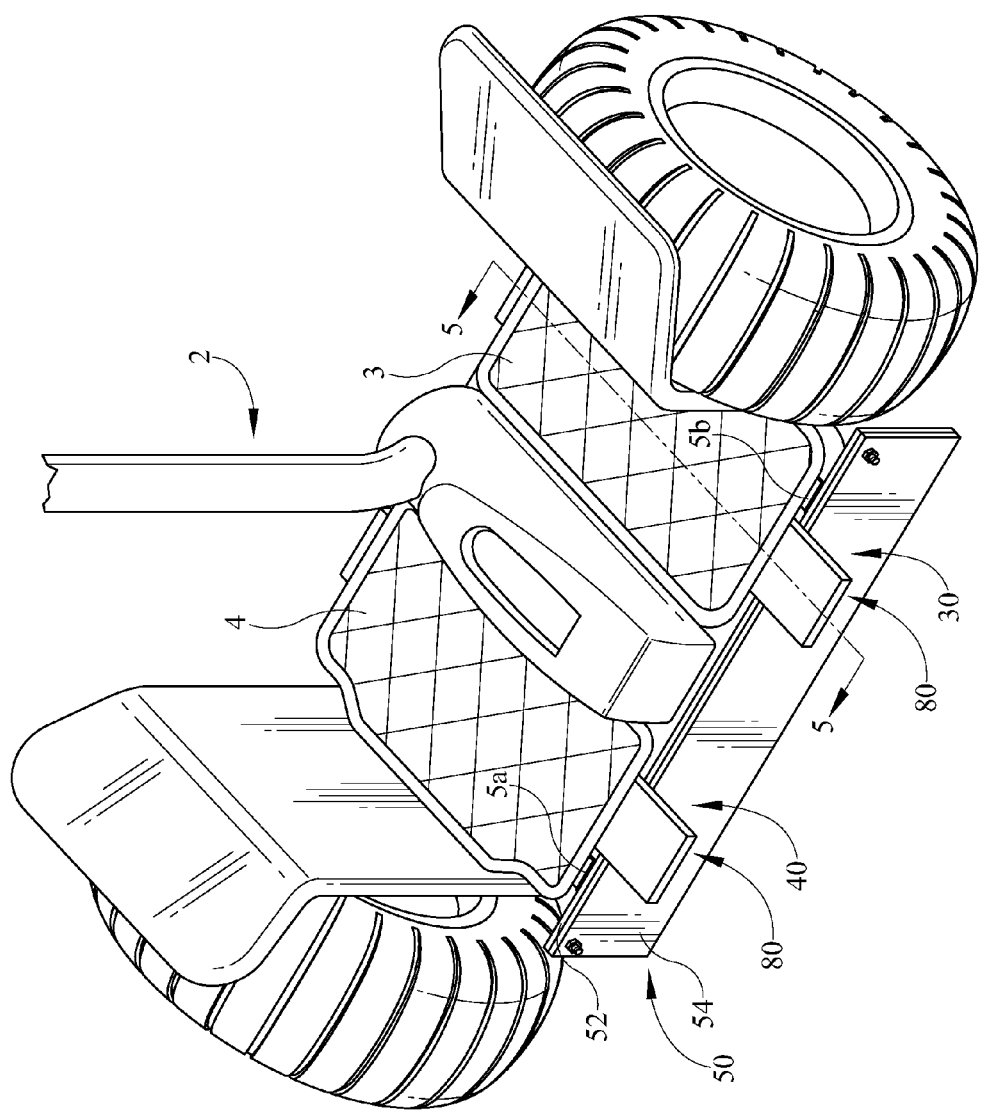
FIG. 2 shows an enlarged, top perspective view the embodiment of FIG. 1, illustrating the kick plates in the disengaged position.
Figure 3:
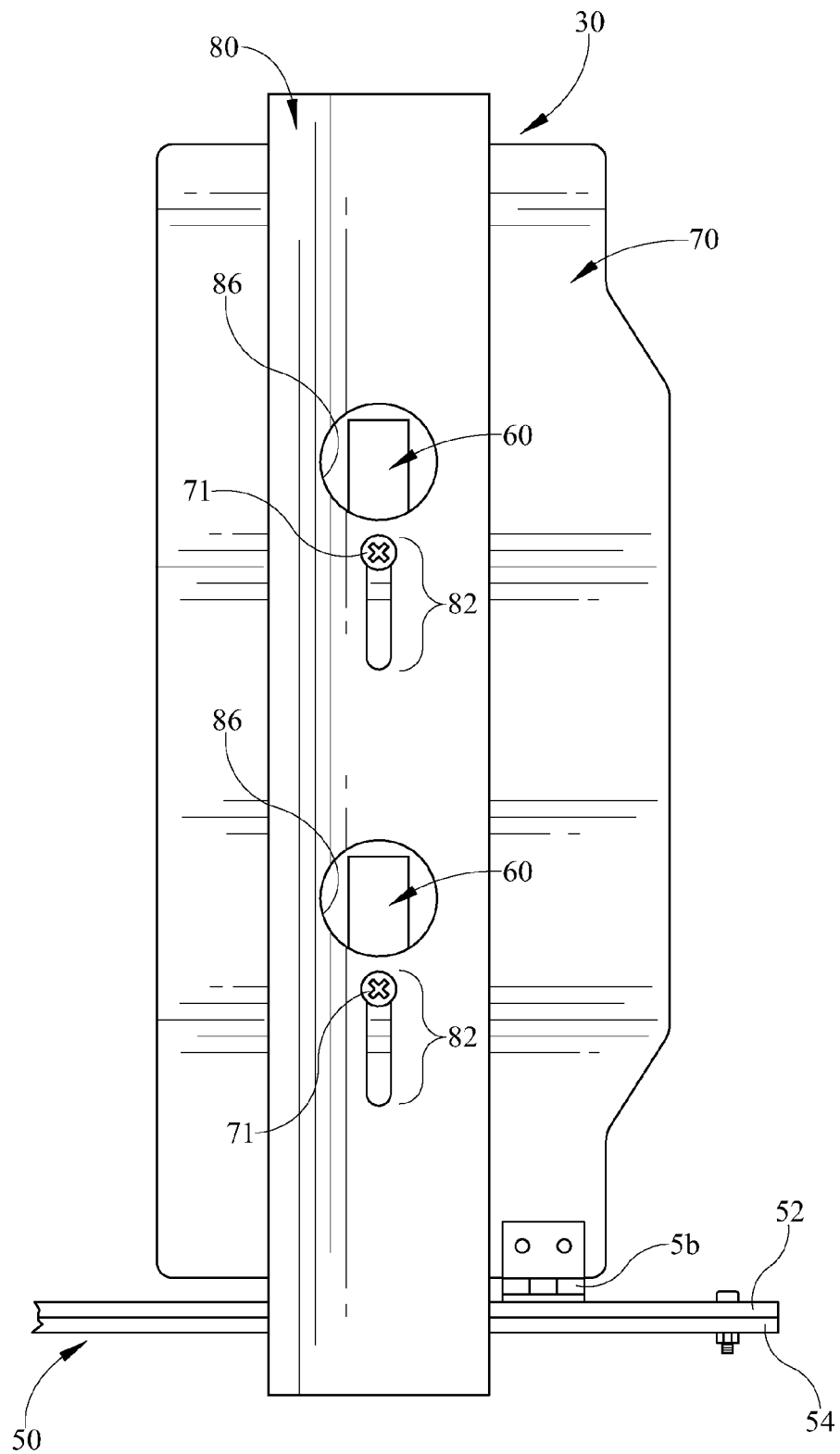
FIG. 3 shows a top view of the right side manual override mechanism and counterweight of FIG. 2, with the counter weight partially broken away.
Figure 5:
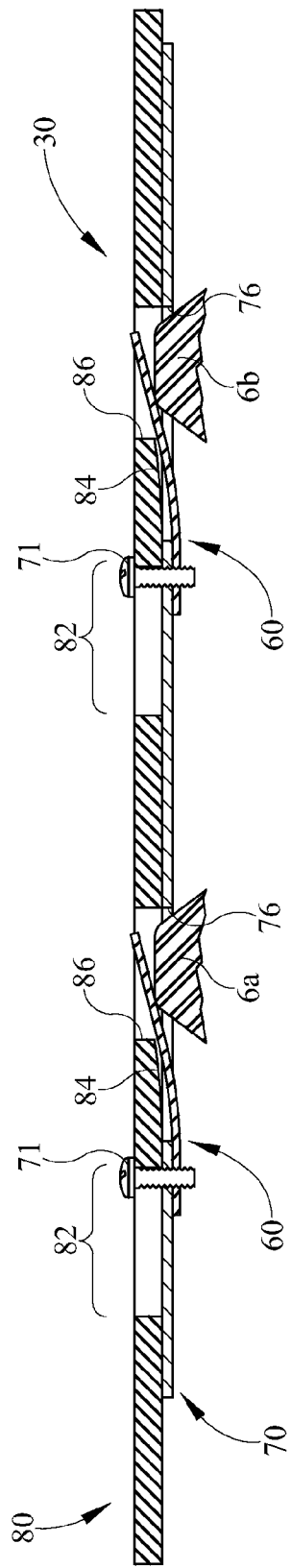
FIG. 5 shows a sectional view of override mechanism of FIG. 2 taken along line 5-5 illustrating the kick plate in the disengaged position.
Figure 6:
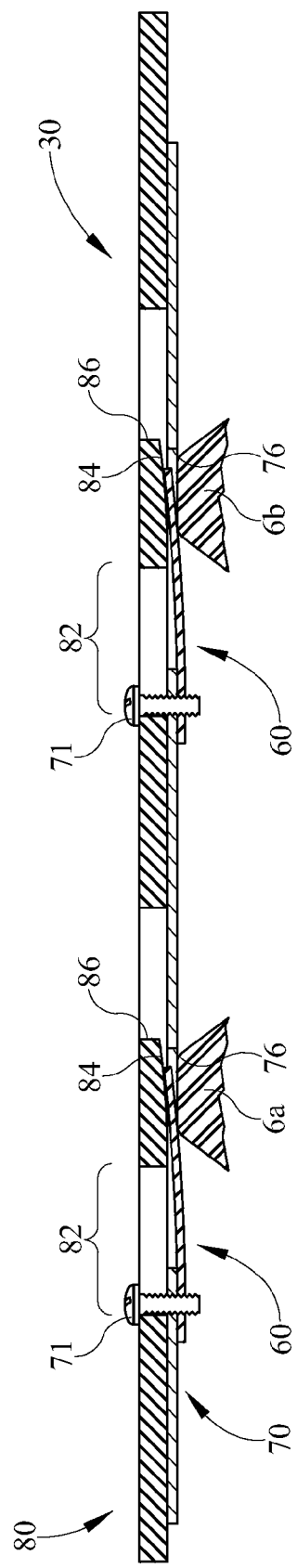
FIG. 6 shows a sectional view of override mechanism of FIG. 1 taken along line 6-6 illustrating the kick plate in the engaged position and overriding the rider detection sensor of the Segway.

As shown in FIG. 6, the existing rider detection sensors or buttons 6a, 6b of each of the existing step pads 3 and 4 are manually overridden to allow for the improved SEGWAY 1 to engage and move without an individual thereon. Thus, once the improved SEGWAY 1 is turned on and balanced, a pair of manual override mechanism 30 and 40 is engaged to override the rider detection sensors of each step pads 3, 4. If however only one override mechanism is engaged, the SEGWAY will still function substantially as intended except for that the SEGWAY will be slower to turn in the direction of the single engaged override mechanism. A pair of sensors 6a, 6b are disposed under each step pad 3, 4. Sensors 6a and 6b under step pad 3 are shown in FIGS. 5 and 6. As shown in FIGS. 1, 2, and 3, a counterweight or "counter weight kick stand" 50 serves to balance the improved SEGWAY 1. Counterweight 50 serves to balance the weight of the existing handle 2 along with the weight of the elongated handle 20, compensating for the lack of a rider. Counterweight 50 is connected to the rear of the SEGWAY platform by a pair of hinges 5a and 5b. Counterweight 50 is a plate 52 made of metal, such as steel; along with tire tread 54 disposed on the outward facing surface of the metal plate 52. The counterweight 50 weighs about 19 lbs. Even with the manual override mechanisms 30 and 40 engaged, the user is able to step back on the SEGWAY and immediately ride. With the pair of rider detection sensors 6a and 6b overridden by the override mechanisms 30 and 40 and counterweight 50 compensating for the handle attachment and lack of rider, the improved SEGWAY 1 may remain balanced and engaged during the entire golfer's game.

Figure 4C:
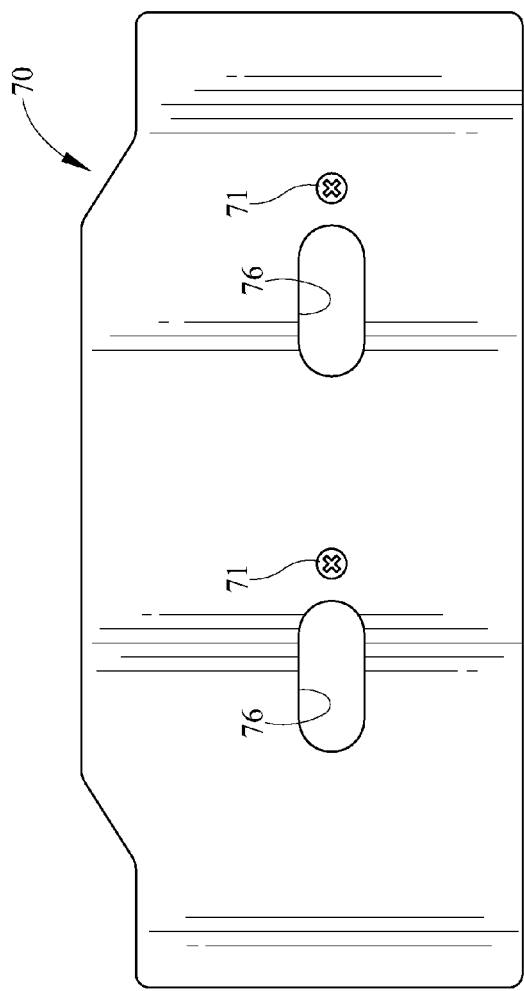
FIG. 4C shows a top view of the right base plate of the manual override mechanism of FIG. 3.
Figure 4B:
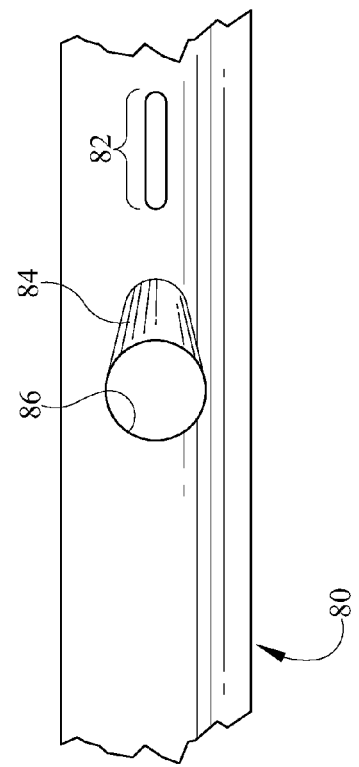
FIG. 4B shows a bottom view of the kick plate of the manual override mechanism of FIG. 3, with portions of the kick plate partially broken away.
Figure 4A:
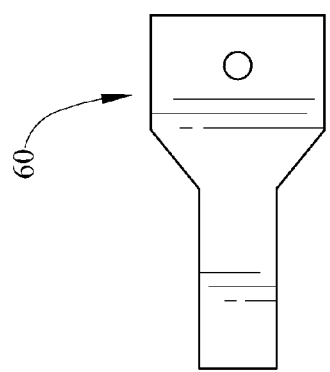
FIG. 4A shows a top view of the tab of the manual override mechanism of FIG. 3.

The manual override mechanisms 30 and 40 of the present embodiment is positionable between an engaged position (FIGS. 1 and 6) and a disengaged position (FIGS. 2, 3, and 5). Each manual override mechanism 30 and 40 is affixed under their respective step pads 3, 4. When in the engaged position shown in FIGS. 1 and 6, a kick plate 80 (FIG. 4B) is positioned towards the front of the SEGWAY 1 whereby a pair of tabs 60 (FIG. 4A) is biased downwardly in contact with respective rider detection sensors 6a, 6b thereby mimicking that a user is currently standing on the SEGWAY. When in the disengaged position shown in FIGS. 2 and 5, the kick plate 80 is positioned towards the rear of the SEGWAY 1 whereby the pair of tabs 60 is unbiased upwardly out of contact with the rider detection sensors 6a, 6b. While the override mechanisms 30 and 40 are in its disengaged position, a rider is able to step upon the step pads 3 and 4 and engage the rider detection sensors just as if the override mechanism was not present. When the kick plates 80 are in the disengaged position (FIGS. 2, 3, and 5), the kick plates 80 extend out from underneath the rear of the step pads 3, 4, whereby the user has access to push or slide the kick plate forward into the engaged position (FIGS. 1 and 6). Once in the engaged position, the kick plates 80 extends out from underneath step pads 3, 4 in the front of the SEGWAY, thus presenting itself for the user to push or slide the kick plate back in the disengaged position. Each kick plate 80 travels along its straight path by a series of slots 82 each restricted by a respective bolt 71 therethrough and extending from the SEGWAY platform and through the base plate 70 (FIG. 4C), thus allowing the kick plate 80 to travel/slide between its disengaged position and the engaged position. As shown in FIGS. 4B, 5, 6, each kick plate 80 also may have a groove 84 adjacent the opening 86 which guides the smaller width of each tab 60 when biased between the engaged and disengaged positions. The kick plates 80, tabs 60, and base plates 70 may be made from metal. Each base plate 70 is rigidly affixed to the platform and is shaped to substantially conform to the surface area under each respective left step pad 4 or right step pad 3. Each base plate 70 has a corresponding opening 76 permitting the rider detection sensor 6a or 6b to pass therethrough. Each tab 60 is fastened to the bottom surface of the base plate 70 adjacent to and extending into the opening 76 above the sensor 6a, 6b when assembled. Each base plate opening 76 corresponds with the openings 86 of the kick plate 80. As shown in FIG. 5, the kick plate opening 86 is aligned with the base plate opening 76 the tabs 60 are not biased into contact with the sensors 6a, 6b the rider detection sensors will not be engaged. However as shown in FIG. 6, as the kick plate 80 travels from the disengaged position to the engaged position, the kick plate opening 86 traverses out of alignment with the base plate opening 76 and sensor 6a, 6b resulting in groove 84 and material adjacent the kick plate opening 86 to bias tabs 60 downwardly to depress and engage the rider detection sensors 6a, 6b. Although it is not shown in the figures, a handbrake and tension cable may be included to assist a variety of manual override mechanisms in overriding the rider detection sensors.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A manual override mechanism for a two wheeled, motorized, self-balancing personal transporter comprising:

said two wheeled, motorized, self-balancing personal transporter with one or more rider detection sensors proximate a step pad, said personal transporter having a front end and a rear end, and a handle positioned at said front end of said personal transporter;

said manual override mechanism having a kick plate, a base plate, and one or more tabs, said kick plate is slidably engaged to said base plate; and said kick plate positionable in an engaged position towards said front end of said personal transporter whereby said one or more tabs are biased downwardly into overriding contact with each one of said one or more rider detection sensors and a disengaged position towards said rear end of said personal transporter whereby said one or more tabs are unbiased upwardly out of overriding contact with each one of said one or more rider detection sensors.

2. The manual override mechanism for said two wheeled, motorized, self-balancing personal transporter as in claim 1 wherein said base plate further includes one or more upwardly projecting bolts and said kick plate includes one or more slots receiving each one of said one or more upwardly projecting bolts that provide for the slidable engagement between said kick plate and said base plate.

3. The manual override mechanism for said two wheeled, motorized, self-balancing personal transporter as in claim 1 further including an elongated handle attachment extending substantially horizontally away from said handle of said personal transporter.

4. The manual override mechanism for said two wheeled, motorized, self-balancing personal transporter as in claim 1 wherein said base plate further includes one or more openings receiving said one or more tabs.

5. The manual override mechanism for said two wheeled, motorized, self-balancing personal transporter as in claim 1 wherein said kick plate further includes one or more openings, wherein said one or more kick plate openings receive said one or more tabs when in said disengaged position and said one or more kick plate openings are positioned out of alignment with said one or more tabs when in said engaged position.

6. The manual override mechanism for said two wheeled, motorized, self-balancing personal transporter as in claim 1 wherein said kick plate further includes a bottom surface, said bottom surface of said kick plate includes one or more grooves guiding each one of said one or more tabs between said engaged position and said disengaged position of said kick plate.

7. The manual override mechanism for said two wheeled, motorized, self-balancing personal transporter as in claim 1 further including a counterweight plate secured to said rear end of said personal transporter.

8. The manual override mechanism for said two wheeled, motorized, self-balancing personal transporter as in claim 7 wherein said counterweight plate is hingedly secured to said rear end of said personal transporter.

9. The manual override mechanism for said two wheeled, motorized, self-balancing personal transporter as in claim 1 wherein said manual override mechanism is positioned beneath said step pad of said personal transporter.

10. The manual override mechanism for said two wheeled, motorized, self-balancing personal transporter as in claim 9 wherein said kick plate projects out from underneath said step pad adjacent said front end of said personal transporter when in said engaged position, and said kick plate projects out from underneath said step pad adjacent said rear end of said personal transporter when in said disengaged position.

* * * * *